United States Patent [19]
Petersen

[11] Patent Number: 5,536,407
[45] Date of Patent: Jul. 16, 1996

[54] NITRIFICATION AND DENITRIFICATION WASTEWATER TREATMENT PROCESS

[75] Inventor: Gert Petersen, Dragoer, Denmark

[73] Assignee: I. Krüger, Inc., Cary, N.C.

[21] Appl. No.: 391,776

[22] Filed: Feb. 21, 1995

[51] Int. Cl.[6] ........................................ C02F 3/30
[52] U.S. Cl. ........................ 210/605; 210/607; 210/626; 210/630; 210/903
[58] Field of Search ........................... 210/605, 607, 210/624, 626, 630, 903, 195.1, 195.3, 202, 209, 253, 259

[56] References Cited

U.S. PATENT DOCUMENTS

| | | | |
|---|---|---|---|
| 3,977,965 | 8/1976 | Tholander et al. | 210/903 |
| 4,948,510 | 8/1990 | Todd et al. | 210/630 |
| 5,137,636 | 8/1992 | Bundgaard | 210/903 |
| 5,252,214 | 10/1993 | Lorenz et al. | 210/903 |
| 5,342,523 | 8/1994 | Kuwashima | 210/605 |

FOREIGN PATENT DOCUMENTS 62-244496  10/1987  Japan .

Primary Examiner—Christopher Upton
Attorney, Agent, or Firm—Rhodes, Coats & Bennett

[57] ABSTRACT

The present invention entails a nitrification-denitrification wastewater treatment process where nitrification and denitrification is carried out in three separate treatment basins. First, wastewater influent is directed from a supply line into a first basin where the wastewater is subject to denitrification. Wastewater held in a second basin is subjected to nitrification while the influent wastewater is directed into the first basin. Effluent from the first basin that is being filled is directed directly to a third basin which performs both denitrification and nitrification at various times during the total process. Purified wastewater from the third basin is directed to a clarifier which separates activated sludge from the purified wastewater and the activated sludge is returned and mixed with the influent wastewater. After a selected time period the influent wastewater being directed to the first treatment basin is switched to where the wastewater influent is now directed into the second treatment basin. Effluent from the second treatment basin is directed directly into the third treatment basin. Throughout the process, each basin is alternately switched between aerobic (Ae) and anoxic (Ao) treatment such that at various times both nitrification and denitrification can be carried out in each of the three basins.

23 Claims, 1 Drawing Sheet

NITRIFICATION AND DENITRIFICATION WASTEWATER TREATMENT PROCESS

FIELD OF INVENTION

The present invention relates to wastewater treatment processes and more particularly to a nitrification and denitrification wastewater treatment process.

BACKGROUND OF THE INVENTION

Nitrogen removal is one of the most difficult problems facing municipalities and sewer authorities throughout the world. A number of factors contribute to the problem. While there has been significant advancement in nitrogen removal through biological treatment, still from a technical point of view, it is very complicated to effectively and efficiently remove nitrogen utilizing any approach or process. This is especially true in view of the very low nitrogen limits now being promulgated by many governmental bodies. Moreover, efficient nitrogen removal requires a wastewater treatment facility having a relatively large capacity and that in turn requires substantial capital expenditures. Many authorities charged with treating wastewater have limited budgets and consequently are severely restricted in terms of their ability to build adequate treatment facilities that will accommodate efficient and effective nitrogen removal processes.

In the past, many of the more successful nitrogen removal processes have been designed to be utilized in relatively large wastewater treatment facilities. Invariably, many of these large wastewater treatment facilities are not designed with a great deal of flexibility. That is, certain basins are designated nitrification basins while other basins are designated denitrification basins. Consequently, it is difficult to vary nitrification and denitrification capacities within that facility. Thus, depending on conditions, there is little opportunity to vary the nitrification and denitrification capacity of the facility to achieve optimum results relative to ammonia and nitrogen removal.

Other types of nitrification and denitrification processes have been designed for use in alternating treatment systems. See for example, U.S. Pat. No. 5,137,636 assigned to I.Krüger Systems A/S of Denmark. Here, the ratio of nitrification time to denitrification time can be adjusted and can be controlled to where the denitrification time constitutes more than fifty (50%) percent of the total operation time of the process. Although this process has met with success, it is appreciated from a review of the disclosure of U.S. Pat. No. 5,137,636, that the process calls for the flow of wastewater through all three basins. In addition, the third basin is continuously maintained under aerobic conditions and does not contribute to denitrification, which under many conditions could be an advantage. Further, the third tank is normally of a different construction, has a smaller volume and different process eqipment than the other two, which is less desirable from a construction as well as an operational point of view.

There has therefore been and continues to be a need for a nitrification and denitrification process that is relatively simple to control, cost efficient, which has maximum flexibility in altering and adjusting that ratio of nitrification time to denitrification time and at the same time can meet very strict effluent demands with respect to nitrogen.

SUMMARY AND OBJECTS OF THE INVENTION

The present invention entails a nitrification and denitrification process that is aimed at overcoming the drawbacks and disadvantages of nitrification and denitrification process of the prior art where a high degree of purification necessitates a rather complicated and costly treatment system. The principle of the present invention is that the wastewater being treated only flows through two of the three ditches or basins during the nitrification and denitrification process. In particular, wastewater influent is directed alternatively to either of two initial treatment basins. One of the initial basins is maintained under anoxic conditions so as to give rise to denitrification while the other initial basin is maintained under aerobic conditions which gives rise to nitrification. Influent wastewater is first directed to one of the initial basins for a selected period of time and then the influent wastewater is switched to where the same is directed into the other initial basin for a selected time. Effluent from the initial basins is in all cases directed from the basin to which there is influent to a third downstream basin. Therefore, one of the initial basins has neither influent nor effluent during the period while the other initial basin has influent and effluent. During the period where there is no influent, the initial basin is always operated under aerobic (Ae) conditions, i.e. nitrification takes place. Thus, the ammonia in this basin is reduced quickly to almost zero which is of great importance in terms of maintaining a very low ammonia concentration in the final effluent.

The third basin is during the course of the process switched between anoxic (Ao) and aerobic (Ae) conditions so as to adjust the need for denitrification during certain time periods of the process and nitrification during other times of the process according to the wastewater composition. Effluent from the third basin is directed to a final clarifier where the activated sludge is separated from purified wastewater and the separated sludge is returned and mixed with the influent wastewater. The net result of this process is that the ratio of nitrification time to denitrification time throughout the process can be varied and controlled according to any specific need (composition of the wastewater, daily/weekly variation in the influent etc.), in relation to existing treatment systems in a more simple and cost efficient manner. In fact, through this process the denitrification time can constitute as much as two-thirds of the total operation time of the process, still with a very low ammonia concentration in the effluent. This means that for instance, the organic material in the raw wastewater can be subject to optimum utilization. This also means that electricity consumption for aeration can be kept at a minimum.

When operating with alternating influent to two initial basins as stated above, higher concentrations of substance are obtained in these basins and thus higher rates of conversion, which again means smaller volumes than for existing, alternating systems. This will be illustrated later.

By using the method in question, less equipment is needed for directing the wastewater to and from the treatment basins and in some cases less aeration equipment can be used for existing, alternating systems with the same capacity.

It is therefore an object of the present invention to provide an efficient and effective process for removing a high degree of ammonia and nitrogen in a more easily operated and cost efficient system than prior art systems.

It is another object of the present invention to provide a nitrogen removal process entailing nitrification and denitrification where the ratio of nitrification to denitrification time can be varied and controlled and wherein the process enables one to allow the denitrification time to constitute as much as two-thirds of the total process time in order to yield an effective and efficient nitrification and denitrification process.

Another object of the present invention is to provide a nitrification and denitrification process that entails a relatively simple flow scheme.

Another object of the present invention is to allow the denitrification time to constitute as much as two-thirds of the total process time in order to yield an effective and efficient nitrification and denitrification process and save electricity for aeration at the same time.

A further object of the present invention is to provide a nitrification and denitrification wastewater treatment process that minimizes aeration equipment requirements for the total process and therefore reduces the overall costs of the facilities needed for the process.

Finally, it is an object of the present invention to provide a nitrification-denitrification process that minimizes the size of the basins required to carry out the process.

The invention can also be used in combination with various pre and post treatments like primary settling, post-filtration, etc. A favorable combination is to place an anaerobic tank (divided in one or more zones) in front of the plant to which the return sludge or part of it from the final settling tank is led together with the wastewater or part of that. From the anaerobic tank, the mixture of sludge and wastewater is led to the three-tank system according to the present invention. Hereby, biological phosphorus removal is obtained simultaneously.

Other objects and advantages of the present invention will become apparent and obvious from a study of the following description and the accompanying drawings which are merely illustrative of such invention.

DETAILED DESCRIPTION OF THE INVENTION

Figure 1:
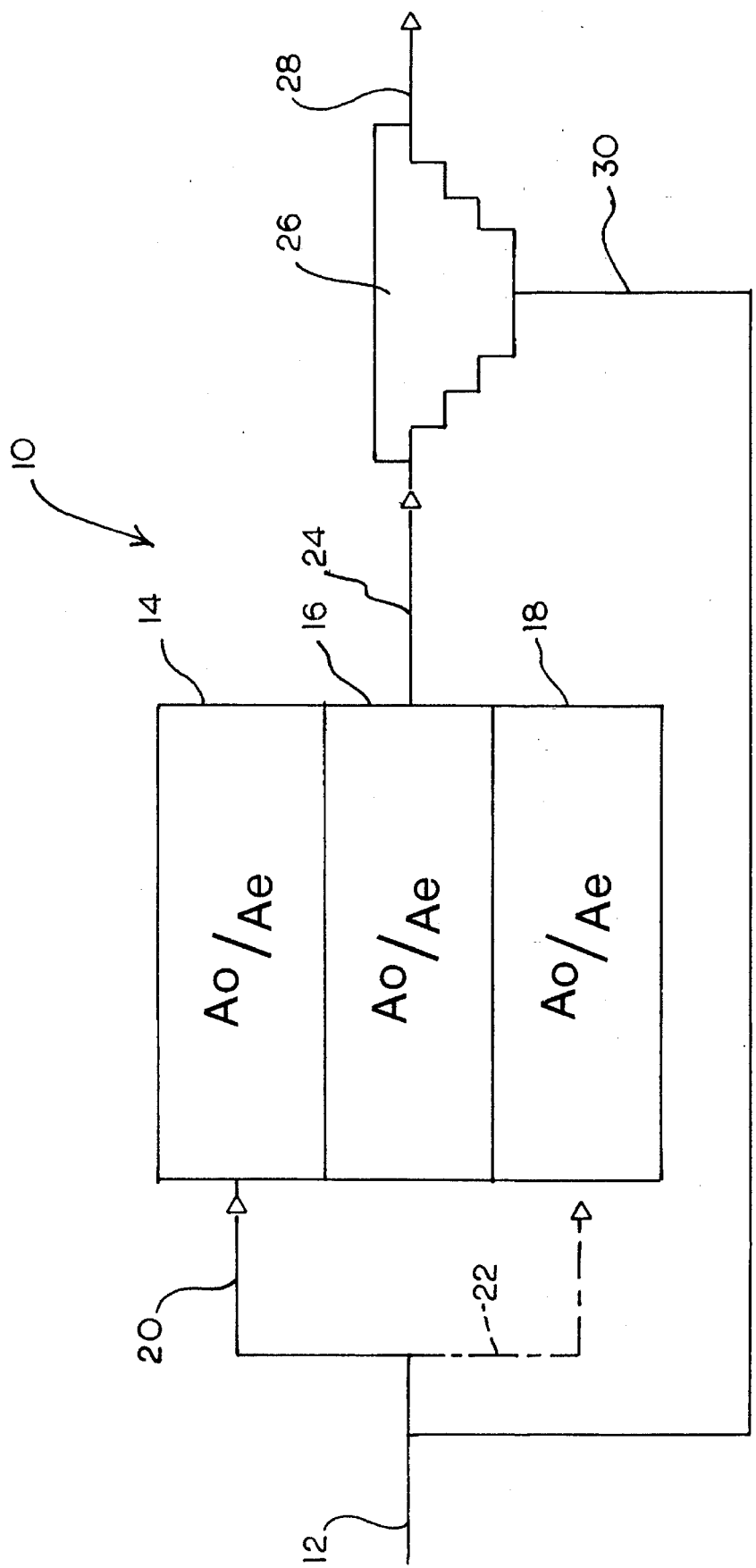
FIG. 1 is a schematic illustration of the wastewater treatment process of the present invention.

The present invention relates to a biological wastewater treatment process for removing ammonia nitrogen ($NH_3$-N) and nitrogen. Prior to discussing the present invention in detail, it will be helpful to review the conventional process of removing nitrogen which entails processes of nitrification and denitrification.

Typically, wastewater influent includes ammonia nitrogen, $NH_3$-N. To remove ammonia nitrogen, a two-step process is called for, nitrification and denitrification. First, the nitrification step entails converting the ammonia nitrogen ($NH_3$-N) to nitrate and a very small amount of nitrite, both commonly referred to as $NO_x$. There are a number of conventional processes that can be utilized in a nitrification process. For example, many conventional activated sludge wastewater treatment processes accomplish nitrification in an aerobic (Ae) treatment zone. In an aerobic treatment zone the wastewater containing the ammonia nitrogen is subjected to aeration and this gives rise to a microorganism culture that effectively converts the ammonia nitrogen to $NO_x$. Once the ammonia nitrogen has been converted to $NO_x$, then the $NO_x$ containing wastewater is typically transferred to an anoxic (Ao) zone for the purpose of denitrification. In the denitrification treatment zone, the $NO_x$ containing wastewater is held in a basin where there is no supplied air and this is conventionally referred to an anoxic treatment zone. Here, a different culture of microorganisms operate to use the $NO_x$ or an oxidation agent and thereby reduce it to free nitrogen to escape to the atmosphere. This basically describes the conventional nitrification and denitrification process. For a more complete and unified understanding of biological nitrification and denitrification, one is referred to the disclosures found in U.S. Pat. Nos. 3,964,998; 4,056,465; and 4,874,519. The disclosures of these three patents are expressly incorporated herein by reference.

Now, turning to the present invention and the nitrification and denitrification process disclosed herein, it is seen in FIG. 1 that the process includes three distinct basins 14, 16 and 18. As seen in the drawing, the central basin 16 is strategically located between the outer basins 14 and 18. It should be appreciated however, that the central basin 16 could be located at other positions relative to the outer basins 14 and 18. As will be appreciated from subsequent portions of this disclosure, the effluent from the outer basins 14 and 18 will flow into the central basin 16.

Continuing to refer to the flow schematic of FIG. 1, note that line 12 is designed to carry or convey influent wastewater. In this connection, influent wastewater can be raw wastewater or wastewater which has been through some kind of primary treatment e.g., primary clarification, an anaerobic treatment for phosphorus removal, etc. Influent wastewater passing through line 12, according to the present process, is alternatively directed into either one of the outer basins 14 and 16 via lines 20 or 22. In particular, wastewater influent passing in line 12 is directed into one of the basins 14 or 18 for a selected time period and then through a conventional valve or other type of switching mechanism the influent wastewater passing in line 12 is directed into the other outer basin 14 or 18. Consequently, according to the present process influent wastewater will, in a normal mode of operation, move through either line 20 or 22. For the purpose of this disclosure, basins 14 and 18 are referred to as initial treatment zones.

Effluent from either basin 14 or 18 is directed directly into the central or third basin 16. Effluent from basin 16 is directed through line 24 to a clarifier, typically a final clarifier 26, where activated sludge is separated from purified effluent. If necessary, an additional treatment system can be inserted between the third basin and the clarifier or after the clarifier for polishing of the wastewater. Purified effluent from the final clarifier 26 is directed out line 28 where the same is directed into a creek, river or other depository. Separated sludge that settles in the final clarifier 26 is returned through return line 30 back to the front end of the treatment facility where the separated activated sludge is mixed with influent wastewater being conveyed in line 12. The mixture of influent wastewater and activated sludge is then directed into either initial treatment basin 14 or 18, according to the process of the present invention.

All three basins 14, 16 and 18 are provided in conventional fashion with aeration and mixing equipment, or equipment which can be used either as aeration or mixing equipment. This enables all three basins to be operated under aerobic or oxic conditions. As noted before, aerobic or oxic conditions implies that air is being furnished to the wastewater and under such conditions the process of nitrification can be carried out. By cutting the aeration equipment off (but maintaining mixing,) each treatment basin can be converted from aerobic (Ae) conditions to anoxic (Ao) conditions (no supplied air) and consequently from a process of nitrification to a process of denitrification.

Therefore, it is appreciated that both nitrification and denitrification can be carried out in each of the treatment ditches or basins 14, 16 and 18. Consequently, the process operator can vary the ratio of nitrification time to denitrification time to effectuate optimum nitrogen and ammonia removal just by adjusting the length of the phases in a cycle.

To illustrate the process of the present invention, the following example is set forth. Assume a BOD/N of 4.0 and influent nitrogen of 50 mg/l. Now, consider the following flow scheme as illustrated in the table below:

| PHASE | FLOW SCHEME AND NITRIFICATION/ DENITRIFICATION MODE | PHASE TIME (MIN.) TYPICAL | RANGE |
|---|---|---|---|
| 1 | 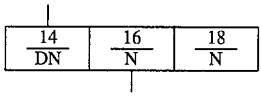 | 21 | 0–60 |
| 2 | 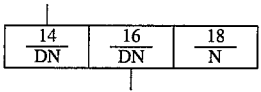 | 18 | 0–60 |
| 3 | 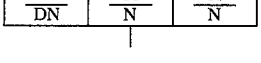 | 21 | 0–60 |
| 4 | 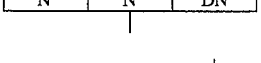 | 21 | 0–60 |
| 5 |  | 18 | 0–60 |
| 6 | 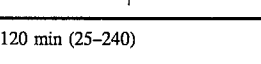 | 21 | 0–60 |

Cycle length 120 min (25–240)

Note that in Phase 1 of the process, influent wastewater is directed into one of the initial outer basins 14. In Phase 1, as illustrated in the table, initial basin 14 receiving the influent wastewater is operated in an anoxic mode to give rise to denitrification (DN) in that outer basin. The other outer basin 18 is operated in a nitrification (N) mode. Note that in this basin there is no influent or effluent. The central basin is also operated in a nitrification mode. Therefore, it is appreciated that in this first phase, that basin 14 is operated in a denitrifying mode while basins 16 and 18 are operated in nitrification modes. As illustrated in the table, Phase 1 is in this example carried out in a typical process for the time period of twenty-one minutes. However, as the table indicates, the time period for Phase 1 may vary from 0 to 60 minutes, according to the composition of the wastewater.

At the conclusion of Phase 1, the treatment within the central basin 16 is changed from nitrification (N) to denitrification (DN). Treatment within basins 14 and 18 remain unchanged as does the flow of wastewater influent into basin 14. This second phase of the process in the example illustrated is carried on for 18 minutes. However, as with the other phases of the process, this phase may vary from 0 to 60 minutes.

At the conclusion of Phase 2, the operational mode of the central basin 16 is again changed. This time, the treatment is changed from denitrification (DN) to nitrification (N). Again, the treatment in the outside initial zones 14 and 18 remains unchanged. This third phase in the example given is carried out for a 21 minute time period.

As the process proceeds from Phase 3 to Phase 4, the wastewater influent is now switched from line 20 to line 22 and directed into initial treatment basin 18. In addition, the aeration equipment in basin 18 is shut down and the treatment in basin 18 is changed from nitrification (N) to denitrification (DN). At the same time, the aeration equipment in basin 14 is started up and consequently in basin 14 there is a change from denitrification (DN) to nitrification (N). At the same time, treatment in the central basin or ditch 16 remains unchanged. Thus, in Phase 4 basins 14 and 16 are operated in a nitrification (N) mode. Phase 4 is carried out for 21 minutes in the example shown. It should be noted that in the anoxic period with no aeration, mixing equipment will normally be used to keep the activated sludge in suspension.

At the conclusion of Phase 4, the treatment within the central basin 16 is changed from nitrification (N) to denitrification (DN). Other than that change, Phase 5 is the same as shown and discussed with respect to Phase 4. Phase 5 in the typical example is carried out for a period of 18 minutes.

The final phase, or Phase 6, is the same as Phase 5 except that the central basin has been changed from a denitrification treatment zone to a nitrification treatment zone. This is carried out for a period of 5 minutes.

Thus, the six phases just discussed above is sufficient in the example shown to carry out a nitrification and denitrification process. In the example shown, it is contemplated that in typical conditions where the influent wastewater is characterized by a BOD content of 25 mg/l and the influent nitrogen is 51 mg/l (C/N ratio of 4.9), that the effluent soluble nitrogen would be less than 5.0 mg/l and the effluent ammonia would be less than 2.0 mg/l.

In the example illustrated, it is appreciated that the time period for the respective phases can vary. It is contemplated that a typical variation period for any one of the phases would be approximately 0 to 60 minutes depending of the need for denitrification. If the C/N ratio is very high or the demand for denitrification very low (less than 33% of the total time), the initial basin with influent can also be operated with aerobic condition in a certain period.

It is appreciated that the forgoing process and system disclosed gives great flexibility in altering the ratio of nitrification time to denitrification time for a particular process. In fact, the process just described enables one to vary the denitrification time to as much as two-thirds of the total process time to yield optimum nitrification and denitrification results.

It must be emphasized that, for an actual plant in operation, the phase lengths can easily be changed according to the actual load/composition of the wastewater. For example, one can first have one set of phase lengths in the daytime, another in the nighttime, another in the weekend, another in the holiday season, etc.

Table 1 shows some examples of the correlation between phase lengths and denitrification time.

TABLE 1

| | PHASE TIME (MIN) | | | | | |
|---|---|---|---|---|---|---|
| % DN | 1 | 2 | 3 | 4 | 5 | 6 |
| 35 | 27 | 3 | 27 | 27 | 3 | 27 |
| 40 | 24 | 12 | 24 | 24 | 12 | 24 |
| 45 | 20 | 20 | 20 | 20 | 20 | 20 |
| 50 | 15 | 30 | 15 | 15 | 30 | 15 |
| 55 | 11 | 38 | 11 | 11 | 38 | 11 |
| 60 | 6 | 48 | 6 | 6 | 48 | 6 |
| 65 | 2 | 56 | 2 | 2 | 56 | 2 |

A surprising characteristic of the present invention is that in spite of the simple construction and the simple flow pattern, better treatment results and/or smaller volumes can be obtained than by using prior art processes which are often more complicated. Also, it should be noted that the process of the present invention is not confined to the process schemes shown or to a percentage denitrification range of 35–65%. By adding additional phases where both initial basins 14 and 16 are aerated, total denitrification times can be adjusted to a level substantially below 35% (e.g. to as low as 13% or below).

From the above, it is seen that the present process is very effective in removing nitrogen while requiring relatively small basins. A computer simulation study comparing the present process with two other well-known alternating basin-type processes confirms the advantages and utility of the process of the present invention.

In this regard, the process of the present invention was compared with: 1) the original two-tank "Bio-Denitro" system disclosed in U.S. Pat. No. 3,977,965 and 2) the three-tank "Trio-Denitro" system disclosed in U.S. Pat. No. 5,137,636. The comparison has been done using the internationally approved mathematical kinetic model for the conversion of COD and nitrogen components in activated sludge plants. (Henze M., Grady C. P. L., Gujer W., Marais G. v. R. and Matsuo T.: The activated sludge model no. 1, IAWPRC, London 1987.) The comparisons have been performed for a range of process conditions, using the standard default values of the model. In all cases, the process of the present invention proves to have the best nitrogen removal using the smallest volumes. The following is the result of one simulated evaluation:

Wastewater Characteristics

| | | | |
|---|---|---|---|
| BOD/N: | 4.9 | Total-N: | 51 mg/l (N = NITROGEN) |
| COD/N: | 10.4 | Tot-COD: | 530 mg/l |
| COD/BOD: | 2.12 | Soluble-COD: | 212 mg/l (40%) |
| | | Total-BOD: | 250 mg/l |
| | | Soluble-BOD: | 100 mg/l (40%) |
| | | SS: | 265 mg/l |
| BOD-loding: | 3675 kg BOD/day | | |
| Flow: | 14700 m³/day | | |
| | 613 m³/hour | | |

Process Conditions

Cycle length: 120 min.
Process temperature: 20° C.
Level of MLSS in process volumes: 4.5 g COD/l
Oxygen setpoint: 1.5 ppm

Simulation Goals

Total soluble N<5 mg N/l

MODEL SIMULATION RESULTS

| PLANT TYPE | TOTAL VOLUME | AMMONIA | NITRATE | AMM. + NITR. |
|---|---|---|---|---|
| Present process | 4250 m³ | 1.47 | 1.68 | 3.15 |
| TRIO-DENITRO (U.S. 5,137,636) | 4620 m³ | 1.05 | 2.40 | 3.45 |
| BIO-DENITRO (U.S. 3,977,965) | 4599 m³ | 1.70 | 1.75 | 3.45 |

It can be deducted from these simulation results that the process of the present inventin is superior to the other known alternating systems yielding lower effluent concentrations of ammonia and nitrate (10%) in a smaller process volume (8%).

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. An activated sludge wastewater treatment process for effectuating nitrification and denitrification utilizing three separate treatment zones, comprising the steps of:

a) alternately introducing influent wastewater into first and second treatment zones;

b) alternately nitrifying and denitrifying the wastewater in the first and second treatment zones during the process such that at one time the first treatment zone performs a nitrification function while the second treatment zone performs a denitrification function and vice versa;

c) alternately directing effluent from the first and second treatment zones to a third treatment zone such that the effluent from the first and second treatment zones passes into the third treatment zone in alternating fashion;

d) alternately nitrifying and denitrifying the wastewater in the third treatment zone during the process such that at one time during the process the wastewater in the third treatment zone will be subjected to nitrification and at another time during the process the wastewater in the third treatment zone will be subjected to denitrification; and e) directing the wastewater from the third treatment zone to a clarifier and separating activated sludge from purified wastewater and mixing at least a portion of the activated sludge with the influent wastewater that is alternately directed into the first and second treatment zones.

2. The method of claim 1 wherein the nitrification and denitrification processes carried out in the first and second treatment zones is timed with respect to the influent wastewater directed to the two zones as the nitrification and denitrification processes are switched each time the influent wastewater is alternated between the two zones.

3. The method of claim 1 wherein the entire nitrification and denitrification process is carried out in only three treatment zones.

4. The method of claim 1 wherein the nitrification-denitrification state of the third treatment zone is altered while the wastewater influent is directed to the same first or second treatment zone thereby resulting in the wastewater within the third treatment zone being subjected to both nitrification and denitrification while wastewater influent is being directed to one of the first or second treatment zones.

5. The process of claim 1 wherein the wastewater passing through the three treatment zones is subjected to denitrification a majority of the time during the nitrification-denitrification process.

6. The method of claim 1 wherein the nitrification and denitrification process includes a series of phases wherein the nitrification/denitrification state of at least one of the three treatment zones is changed from one phase to the next phase.

7. The method of claim 6 wherein the wastewater is treated for a period of approximately 1 to 60 minutes during a number of phases during the nitrification/denitrification process.

8. The process of claim 6 wherein the nitrification/denitrification process includes at least six phases of treatment.

9. The method of claim 1 wherein all wastewater treated by the three zones pass through the third treatment zone.

10. The method of claim 9 wherein all wastewater directed to the third treatment zone passes from either the first treatment zone or the second treatment zone.

11. An activated sludge wastewater treatment process for effectuating nitrification and denitrification utilizing three treatment basins comprising the steps of:

a) directing wastewater influent from a supply line into a first treatment basin for a selected time period;

b) switching the flow of wastewater from the first treatment basin to a second treatment basin and directing the influent wastewater from the supply line into the second treatment basin for a selected time period;

c) nitrifying wastewater in one of the first and second treatment basins while denitrifying wastewater in the other treatment basin;

d) directing effluent directly from either the first or second treatment basin to a third treatment basin;

e) subjecting the wastewater in the third treatment basin to both nitrification and denitrification at various times during the nitrification-denitrification process to produce a purified effluent; and f) separating activated sludge from the purified effluent and mixing at least a portion thereof with the influent wastewater.

12. The method of claim 11 wherein at any time within the process either the first or second treatment basins will be receiving influent wastewater from the supply line and wherein the wastewater within the basin being filled with such wastewater influent will be subjected to a denitrification process.

13. The method of claim 12 wherein the first and second basins are both initial treatment basins and wherein nitrification is carried out in the initial treatment basin not being filled with influent wastewater by the supply line.

14. The method of claim 11 wherein the third treatment zone is switched between nitrification and denitrification at least once while one of the first or second treatment zones is filled.

15. The method of claim 11 including the step of directing substantially all of the wastewater directed into the first and second treatment basins to and through the third treatment basin and wherein the effluent of the third treatment basin is directed to a clarifier wherein activated sludge is separated from the purified effluent.

16. The method of claim 15 wherein during the nitrification/denitrification process each of the three treatment basins carry out both a nitrification process and a denitrification process at different times during wastewater treatment process.

17. The method of claim 16 wherein the nitrification/denitrification process includes a series of phases wherein each phase differs from a preceding phase in that at least one of the treatment basins assumes a different nitrification/denitrification state relative to a previous phase.

18. The method of claim 17 wherein each phase is maintained for a time period of approximately 1 to 60 minutes.

19. The method of claim 18 wherein the nitrification/denitrification process includes at least six phases.

20. The method of claim 11 wherein each treatment basin carries out both nitrification and denitrification at different times during the process, and wherein all wastewater directed through the first and second treatment basins pass through and is treated by the third treatment basin before activated sludge is separated from the purified effluent of the third basin.

21. The method of claim 20 wherein during the process of nitrification/denitrification the nitrification/denitrification state of at least one basin will be changed and each such change will define the beginning of a phase of treatment, and wherein the nitrification/denitrification process includes multiple phases.

22. The method of claim 20 wherein certain phases of the nitrification/denitrification process are carried out for a time period of approximately 1 to 60 minutes.

23. The method of claim 11 wherein the time periods that the respective treatment basins are carrying out nitrification or denitrification can be varied such that the total denitrification time can range from approximately 35 to 65% of the total process time.

* * * * *